Patented June 29, 1937

2,085,064

UNITED STATES PATENT OFFICE 2,085,064

AROMATIC MERCURY CYCLIC ALKALOID COMPOUNDS AND METHOD OF MAKING THEM

Carl N. Andersen, Watertown, Mass., assignor to Lever Brothers Company, a corporation of Maine No Drawing. Application January 21, 1935, Serial No. 2,757

15 Claims.  (Cl. 260—13)

The present invention relates to the production of certain new organic mercury compounds, and more particularly to aromatic mercury derivatives of cyclic alkaloids.

It is an object of my invention to produce new organic mercury compounds useful as germicides and for other therapeutic purposes.

I have discovered that if the essential radical of an aromatic mercury compound, consisting of an aromatic nucleus to which mercury is directly attached, is introduced into certain cyclic alkaloids, compounds are produced which have extremely high potency as antiseptics and germicides, and at the same time are characterized by relatively low toxicity and other desirable properties.

The above mentioned aromatic mercury cyclic alkaloids contain the essential radical RHg— linked to a cyclic alkaloid.

R represents an aromatic structure which may be an aromatic nucleus with or without side chains, and the expression "aromatic structure" used herein is intended to be generic and include an aromatic nucleus with or without side chains. The aromatic structure is one of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons in which all of the nuclear carbon atoms, other than the one attached to mercury, and any side chain carbon atoms, have their valences satisfied by either carbon or hydrogen. Examples are the diphenyl, tolyl, xylyl and naphthyl groups.

The complex structure of many of the alkaloids renders their investigation a matter of extreme difficulty, and despite a century of research, the constitution of all of these substances is not known. However, enough is known of their structure so that they may be grouped into two main classes: aliphatic and cyclic. Aliphatic alkaloids include derivatives of purine, such as xanthine, theophylline, and theobromine. The structure of alkaloids of this type is better understood, and in general they are imides, which are disclosed and claimed in my copending applications, Serial Nos. 754,373 and 754,374, both filed November 22, 1934.

My present invention is concerned with the more complex cyclic alkaloids. One authority has classified the compounds which have been identified as to structure into four main groups.

1. *Derivatives of pyridine.*—Examples are piperine, $C_{17}H_{19}O_3N$; coniine, $C_8H_{17}N$; pilocarpine, $C_{11}H_{16}O_2N_2$; and nicotine, $C_{10}H_{14}N_2$.

2. *Tropine group or alkaloids with condensed tetrahydropyrrole and piperidine chains.*—Examples are atropine, $C_{17}H_{23}O_3N$; cocaine, $C_{17}H_{21}O_4N$; ecgonine, $C_9H_{15}O_3N$; and norecgonine, $C_8H_{13}O_3N$.

3. *Derivatives of quinoline.*—An example is quinine, $C_{20}H_{24}O_2N_2$.

4. *Derivatives of iso-quinoline.*—Examples are: narcotine, $C_{22}H_{23}O_7N$; codeine, $C_{18}H_{21}O_3N$; papaverine, $C_{20}H_{21}O_4N$; hydrastinine, $C_{11}H_{13}O_3N$; and cotarnine, $C_{12}H_{15}O_4N$.

Later research has added other groups and newly identified cyclic alkaloids:

*Tetrahydropyrrole bases.*—An example is tetrahydropyrrole, $C_4H_9N$.

*Aromatic amines.*—Examples are hordeinine, $C_{10}H_{15}ON$; tyramine, $C_8H_{11}ON$.

*Indole derivatives.*—An example is strychnine, $C_{21}H_{22}O_2N_2$.

There are many other cyclic alkaloids whose exact structure is as yet unknown. Examples are aconitine, cytisine, and colchicine.

I have investigated most of the above named compounds by reacting them with an aromatic mercury compound of the type described so as to produce a corresponding aromatic mercury alkaloid. I have prepared a sufficiently representative number of these compounds to lead me to believe that all of the cyclic alkaloids can be employed to produce my novel aromatic mercury alkaloids. I therefore intend my invention to include all cyclic alkaloids whether their exact structure is known or not. The compounds so prepared have a greater or lesser, but always a relatively high degree of antiseptic and germicidal properties. The expression "cyclic alkaloids" is intended to be generic and include any of the above named compounds, their homologues and equivalents.

These aromatic mercury alkaloids may be prepared by reacting a soluble mercury compound containing the aromatic mercury radical with the alkaloid. An aromatic mercury hydroxide or any soluble salt such as the acetate or lactate is preferably employed. The cyclic alkaloid and the aromatic mercury compound are brought together in a common solvent which will not enter into the reaction. The aromatic mercury alkaloids so produced, being relatively insoluble, will precipitate or can be precipitated by concentrating the solution. The precipitate can be filtered, washed and dried. More detailed instructions relating to the process will be given later in connection with several specific examples.

I have mentioned before that the alkaloids are very complex in structure, and their chemical properties, structure, and the reactions in which they enter are determined only with extreme difficulty. Even in the case of alkaloids whose structure is known, I have not so far been able to determine the exact position in the alkaloid molecule in which the aromatic mercury radical enters or the particular chemical mechanism of the reaction. I cannot therefore unqualifiedly state the structure of the compounds I have produced. Having stated the method by which any of the compounds of the group may be made, which will enable one skilled in the art to practice my invention, I prefer not to speculate as to the exact formula to be assigned to each compound.

The following examples are given as illustrative of the methods by which all of the compounds of this type may be prepared and as illustrative of aromatic mercury alkaloids falling within the scope of my invention.

Example 1

15.65 grams of piperine is dissolved in alcohol. To this is added 16.08 grams of phenylmercury acetate and a white crystalline precipitate results upon the reaction of the two compounds. The precipitate is separated by filtration and washed well with warm water and dried. Upon recrystallization from alcohol it melts at 108–110° C. The compound is the phenylmercury derivative of piperine.

Example 2

4.55 grams of hydrastinine is dissolved in 50 cc. of alcohol. If hydrastinine hydrochloride is used, 5.31 grams should be treated with the theoretical amount of sodium hydroxide to liberate the free base. To this solution is added 5.88 grams of phenylmercury hydroxide dissolved in one liter of water. Heat may be employed to dissolve the phenylmercury hydroxide and the solution may be filtered before mixing with the hydrastinine. No precipitate results upon the mixture of the two solutions, but the solution assumes a yellowish tint. The material is evaporated to ½ its volume and allowed to stand, out of which a yellowish solid separates. The precipitate is separated by filtration, after which it is washed well with warm water and a few cc. of alcohol, and dried. Upon recrystallization from alcohol it softens at 232° C. and melts at 238° C. The compound is the phenylmercury derivative of hydrastinine.

Example 3

3.36 grams of phenylmercury acetate is dissolved in 200 cc. of water and heated until solution is complete. The solution is filtered to remove any insoluble material. To the filtrate is added an alcoholic solution containing 2.89 grams of atropine. A beautiful white crystalline precipitate results. The mixture is allowed to stand, after which it is filtered and the precipitate washed well with warm water and dried. It has a melting point of 150–155° C. The compound is the phenylmercury derivative of atropine.

Example 4

3.36 grams of phenylmercury acetate is dissolved in 200 cc. of water and heated until solution is complete. The solution is filtered to remove any insoluble material. To this solution is added 3.56 grams of quinine dissolved in alcohol. The solution is boiled to remove the alcohol and upon standing beautiful, shiny, scaly crystals separate. These are removed by filtration, washed well with warm water and dried. The compound has a melting point of 128–132° C. and is the phenylmercury derivative of quinine.

Example 5

5.88 grams of phenylmercury hydroxide is dissolved in 1 liter of water and heated until solution is complete. The solution is filtered to remove any gum or foreign material which remains in the solution.

In a separate container 4.78 grams of ecgonine hydrochloride is dissolved in warm water. The free alkaloid is liberated by neutralizing this material with .8 gram of sodium hydroxide. This solution is then added to the phenylmercury hydroxide solution and a voluminous white precipitate results which is separated by filtration, washed well with warm water and dried. It melts at 238–241° C. and upon recrystallization from alcohol has a melting point of 249° C. The compound is the phenylmercury derivative of ecgonine.

Example 6

4.13 grams of narcotine is dissolved in 20 cc. of chloroform. To this solution is added 3.36 grams of phenylmercury acetate dissolved in 200 cc. of water. The mixture is heated to expel the chloroform and then allowed to cool. Well defined crystals separate which are removed by filtration, washed well with warm water and dried. The material melts at 138–150° C. and upon recrystallization from alcohol melts at 171.5° C. The compound is the phenylmercury derivative of narcotine.

The reacting materials are employed in substantially theoretical quantities. If desired, in some instances, 10% excess of the alkaloid may be employed in order to insure the complete conversion of the phenylmercury compound.

Any suitable solvent in which the reacting componets are soluble may be used as the medium for carrying out the reaction. As most alkaloids are soluble in one of the alcohols, or mixtures of an alcohol and water, this medium is convenient. However, water or other solvents, such as acetone, chloroform, or mixtures of these with each other or with water, may be employed if the alkaloid and the phenylmercury compound are soluble therein. The process may be carried out at any temperature, for example, room temperature. In most cases I find, however, that the use of heat facilitates the solution of the reacting components and speeds the reaction.

From the description of the specific examples it will be readily apparent to one skilled in the art how the other members of the cyclic alkaloid group may be reacted with an aromatic mercury compound to produce mercury alkaloids of analogous structure. All of the compounds produced as above described are characterized by highly satisfactory antiseptic and germicidal properties. Because of their high germicidal value they may be used in extreme dilutions.

In addition to their germicidal value they may have other uses in medicine, for example the cocaine derivative also functions as a local anesthetic.

All of the compounds produced as above described are characterized by extraordinarily high potency as germicides. Tests to determine the efficacy of certain of them in killing *B. typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. Special method against *Staph. aureus* at 37° C.

As illustrative of the potency of the compounds, the killing power of the following compounds is given merely as illustrative:

The figures represent the maximum dilutions at which killing in 15 minutes resulted:

|  | B. typhosus | Staph. aureus |
|---|---|---|
| Phenylmercury ecgonine | 1:60,000 | 1:20,000 |
| Phenylmercury coniine | 1:80,000 | 1:30,000 |

All of these compounds retain a high degree of germicidal activity when incorporated in soap and various other menstrums employed in making germicidal compositions.

When these new compounds are to be used directly as germicides they may be employed in aqueous or other solutions or they may be formed into various preparations such as mouth washes, tooth pastes, soaps, ointments, etc.

I claim:

1. A method of making aromatic mercury cyclic alkaloid compounds which comprises reacting in solution a cyclic alkaloid with a compound selected from the group consisting of the aromatic mercury hydroxides and aromatic mercury soluble salts of soluble acids in which the mercury is directly attached by one of its valences to the negative radical in the compound and attached by its other valence to a carbon atom of an aromatic structure in which none of the carbon atoms has direct linkage with any element other than hydrogen, carbon and mercury.

2. A method of making aromatic mercury cyclic alkaloid compounds which comprises reacting in solution a cyclic alkaloid with an aromatic mercury hydroxide in which the mercury is directly attached to a carbon atom of an aromatic structure in which none of the carbon atoms has direct linkage with any element other than hydrogen, carbon and mercury.

3. A method of making aromatic mercury cyclic alkaloid compounds which comprises reacting in solution a cyclic alkaloid with an aromatic mercury soluble salt of a soluble acid in which the mercury is directly attached to a carbon atom of an aromatic structure in which none of the carbon atoms has direct linkage with any element other than hydrogen, carbon and mercury.

4. A method of making aromatic mercury cyclic alkaloid compounds which comprises reacting in solution a cyclic alkaloid with an aromatic mercury acetate in which the mercury is directly attached to a carbon atom of an aromatic structure in which none of the carbon atoms has direct linkage with any element other than hydrogen, carbon and mercury.

5. A new aromatic mercury compound in which the radical RHg—is attached to a cyclic alkaloid, where R represents an aromatic structure to a carbon atom of which the mercury is directly attached and in which none of the carbon atoms has direct linkage with any element other than hydrogen, carbon and mercury.

6. A new aromatic mercury compound in which the radical RHg—is attached to a cyclic alkaloid of the quinoline group, where R represents an aromatic structure to a carbon atom of which the mercury is directly attached and in which none of the carbon atoms has direct linkage with any element other than hydrogen, carbon and mercury.

7. A new aromatic mercury compound in which the radical RHg—is attached to a cyclic alkaloid of the tropine group, where R represents an aromatic structure to a carbon atom of which the mercury is directly attached and in which none of the carbon atoms has direct linkage with any element other than hydrogen, carbon and mercury.

8. A new aromatic mercury compound in which the radical RHg—is attached to a cyclic alkaloid of the iso-quinoline group, where R represents an aromatic structure to a carbon atom of which the mercury is directly attached and in which none of the carbon atoms has direct linkage with any element other than hydrogen, carbon and mercury.

9. A new phenylmercury compound in which the radical $C_6H_5Hg$—is attached to a cyclic alkaloid.

10. A new phenylmercury compound in which the radical $C_6H_5Hg$—is attached to a cyclic alkaloid of the quinoline group.

11. A new phenylmercury compound in which the radical $C_6H_5Hg$—is attached to a cyclic alkaloid of the tropine group.

12. A new phenylmercury compound in which the radical $C_6H_5Hg$—is attached to a cyclic alkaloid of the iso-quinoline group.

13. Phenylmercury quinine.
14. Phenylmercury atropine.
15. Phenylmercury papaverine.

CARL N. ANDERSEN.